US008832226B2

(12) United States Patent
Harnevo et al.

(10) Patent No.: US 8,832,226 B2
(45) Date of Patent: Sep. 9, 2014

(54) USING CLOUD COMPUTING FOR GENERATING PERSONALIZED DYNAMIC AND BROADCAST QUALITY VIDEOS

(75) Inventors: Oren Harnevo, Brooklyn, NY (US); Gal Barnea, Tel-Aviv (IL)

(73) Assignee: Eyeview, Inc., Tel-Aviv (IL)

( * ) Notice: Subject to any disclaimer, the term of this patent is extended or adjusted under 35 U.S.C. 154(b) by 269 days.

(21) Appl. No.: 13/368,037

(22) Filed: Feb. 7, 2012

(65) Prior Publication Data

US 2013/0091243 A1 Apr. 11, 2013

Related U.S. Application Data

(60) Provisional application No. 61/545,211, filed on Oct. 10, 2011.

(51) Int. Cl.
*G06F 15/16* (2006.01)
*G06Q 30/00* (2012.01)
*H04N 21/00* (2011.01)
*H04N 21/258* (2011.01)
*H04N 21/81* (2011.01)
*H04N 21/234* (2011.01)
*H04N 21/2668* (2011.01)
*H04N 21/61* (2011.01)
*H04N 21/2665* (2011.01)
*H04N 21/8543* (2011.01)

(52) U.S. Cl.
CPC .............. *G06Q 30/00* (2013.01); *H04N 21/00* (2013.01); *H04N 21/25891* (2013.01); *H04N 21/25841* (2013.01); *H04N 21/812* (2013.01); *H04N 21/23412* (2013.01); *H04N 21/2668* (2013.01); *H04N 21/6125* (2013.01); *H04N 21/2665* (2013.01); *H04N 21/8543* (2013.01)

USPC ........ 709/217; 709/203; 709/246; 705/14.49; 705/14.67

(58) Field of Classification Search
CPC ....... H04L 67/18; H04L 67/28; H04L 65/601; H04L 65/602; H04L 65/605; H04N 21/2343; H04N 21/2355; H04N 21/2358; H04N 21/25
USPC ........................................... 705/14.49–14.67
See application file for complete search history.

(56) References Cited

U.S. PATENT DOCUMENTS 7,904,922 B1   3/2011   Haberman et al.
8,006,261 B1   8/2011   Haberman et al.

(Continued)

FOREIGN PATENT DOCUMENTS

WO   WO0177776 A2   10/2001
WO   WO0177776 A3   10/2001

(Continued)

*Primary Examiner* — Duyen Doan
(74) *Attorney, Agent, or Firm* — Symbus Law Group, LLC; Clifford D. Hyra

(57) ABSTRACT

Embodiments of the present invention relate to a method of obtaining parameters of a digital video to be provided to users of a network. The method includes modifying one or more of the obtained parameters, such that the modification is based on information relating to segments of the users of the network. In addition, the method includes creating a plurality of versions of the digital video. Each one of the plurality of versions comprises a broadcast quality digital video adapted to appeal to at least one of the segments of the users of the network. Further, the method includes monitoring the computing cloud to obtain an assessment of rendering resources available to the computing cloud in rendering the plurality of digital videos, and coordinating allocations of the rendering resources in rendering the plurality of digital videos based on the real time assessment.

25 Claims, 6 Drawing Sheets

(56) References Cited

U.S. PATENT DOCUMENTS

| | | |
|---|---|---|
| 8,396,577 B2* | 3/2013 | Kraemer et al. ............... 700/94 |
| 2008/0319828 A1* | 12/2008 | Southam et al. ............... 705/10 |
| 2009/0063280 A1* | 3/2009 | Wurster et al. ............... 705/14 |
| 2009/0138544 A1* | 5/2009 | Wegenkittl et al. ........... 709/203 |
| 2010/0023863 A1 | 1/2010 | Cohen-Martin |
| 2010/0082440 A1* | 4/2010 | Vaidyanathan et al. ... 705/14.72 |
| 2011/0162025 A1* | 6/2011 | Kellerman et al. ............ 725/116 |
| 2011/0208570 A1* | 8/2011 | Kong ........................... 705/14.5 |
| 2011/0214046 A1 | 9/2011 | Haberman et al. |
| 2011/0264523 A1* | 10/2011 | Scott et al. ................ 705/14.52 |
| 2012/0131178 A1* | 5/2012 | Zhu et al. ..................... 709/224 |
| 2012/0246003 A1* | 9/2012 | Hart et al. .................. 705/14.57 |
| 2012/0331113 A1* | 12/2012 | Jain et al. ..................... 709/220 |

FOREIGN PATENT DOCUMENTS

| | | |
|---|---|---|
| WO | WO0177939 A1 | 10/2001 |
| WO | WO2004023437 A2 | 3/2004 |
| WO | WO2004023437 A3 | 6/2004 |

\* cited by examiner

USING CLOUD COMPUTING FOR GENERATING PERSONALIZED DYNAMIC AND BROADCAST QUALITY VIDEOS

BACKGROUND

1. Technical Field

The present invention relates to a method for generating personalized broadcast quality digital videos delivered over the World Wide Web on all screens.

2. Discussion of the Related Art

Wide spread digital mediums, such as the Internet, have provided digital providers an almost unlimited platform for reaching and distributing content to almost any region or any country in the world. Indeed, advertisers and vendors currently user the World Wide Web as an extensive marketing tool for disseminating information relating their products and services in a wide variety of digital forms and venues. One such venue that has become quite popular are digital videos, such as those that are intermittently downloaded during regularly watched web video including a wide variety of content, some of which may include advertizing ads and commercials appearing before, between or after the webpage and/or video the viewer is watching. Normally displayed on a computer screen, handheld device, a smart phone, connected TV or the like for a few minutes or so, a user usually views such ads as clips illustrating moving images, objects, actors and all elements typically involved in a movie video adapted to promote, enhance, or otherwise convey marketing and related information.

While technological advancement have been made in developing and distributing marketing videos to many users, such videos will always remain generic in nature and those may not provide specific content with which certain users located in certain region or users belonging to certain segments, i.e., genders, cultures can personally associate. For example, a commercial video adapted to promote items, such as an automobiles, household products, clothes, beverages and the like, may inherently include scenery, sounds, or other type of features to which certain users may not necessarily relate or have any personal affiliation. More specifically, as part of an advertisement, vendors can mass distribute commercial a video to a variety of locales, behavioral or demographic information dispersed over area such that those sceneries, sounds and images (i.e., weather condition, certain population segments) may not be part of the everyday life or experience of the viewer because watching such a videos. Thus, specific viewers may not connect on a personal level with the provided wide spread and generic commercial content. Consequently, vendors may miss out on promoting their products and/or services to a wide range of audience as would be desired for by any vendor for achieving a robust marketing effort. In addition, effective distribution of such videos over wide network may be computationally demanding and costly to the extent it may discourage distributing vendors from disseminating their promotional material to users over the network.

BRIEF SUMMARY

Exemplary embodiments of the present technique disclose a method and systems for personalizing video data generally provided in a digital medium like Internet and network connected devices. In some embodiments of the present technique, the processing, encoding and distributing of personalized videos is performed by a core rendering engine, such as one distributed over a computing cluster, or a computing cloud having multiple servers and/or dedicated processing devices adapted to efficiently and handle large amount of data. Such devices may include an orchestrating device for overseeing the retrieval of original ad information, as well as the dynamical processing, rendering (or partial rendering), and/or encoding of numerous personalized videos adapted to appeal and/or target various segments of network users in accordance with certain personalized, preferences and/or attributes of the users.

In further aspects of the present technique, the disclosed computing cluster operates to retrieve original data feeds, as well as voluminous ad information, such as webpages, movie ads, and so forth. The cluster is adapted to alter the retrieved information, in accordance with personalized data, to ultimately encode and distribute custom fitted videos intended for various users having various personal preferences and/or users located in different regions and places. In other aspects of the present technique, videos processed and rendered by the rendering engine of the computing cloud are custom fitted to appeal to certain users based on specific behavioral, demographic, and/or gender-based attributes with which certain users may be associated. Accordingly, personalization of the videos may be based upon information provided by vendors or third party entities, or other entities wishing to promote or offer various products. In other aspects according to the present technique, the computing cluster may generate videos personalized in accordance to certain objective, or user independent criteria, such as those taking into account certain times of a day, days of a week, or those shown in certain time of a year such holidays and/or special commemorative occasions to which certain individuals accessing the network can relate. While the present technique may alter an original video ad to create multiple ad versions targeting the various dispersed users, nevertheless, the present technique is adapted to preserve the substantive content the overall uniformity conveyed by the different ads ultimately created.

While the present technique may alter an original video ad to create multiple ad versions targeting and/or appealing to the various dispersed users, the present technique is, nevertheless, adapted to preserve the substantive content and the overall uniformity conveyed by the different ads ultimately created. In addition, the present technique provides the multiple ad versions of the video while achieving broadcast quality of those multiple version equivalent, if not better, to the broadcast quality of the originally obtained ad video. Hence, in so doing, the present technique provides each of the multiple versions of videos in a quality that appears and, indeed, matches an original video, so that certain users watching a video tailored in accordance with their personal and/or other preferences may perceive the video in broadcast quality an originally obtained and distributed video. Hence, the term broadcast quality, as used herein, refers to a quality of video forming the multiple versions of videos adapted to appeal to certain users to match the quality of an otherwise original video provided to an entire network.

While the present technique, as implemented through multiple rendering engines of a computing cloud, may alter an original video ad to create multiple ad versions targeting and/or appealing to the various dispersed users, the present technique is, nevertheless, adapted to preserve the substantive content and the overall uniformity conveyed by the different ads ultimately created. In addition, the present technique provides the multiple ad versions of the video while achieving broadcast quality of those multiple version equivalent, if not better, to the broadcast quality of the originally obtained ad video. Hence, in so doing, the present technique provides each of the multiple versions of videos in a quality that appears and, indeed, matches an original video, so that certain users watching a video tailored in accordance with their personal and/or other preferences may perceive the video in broadcast quality an originally obtained and distributed video. Hence, the term broadcast quality, as used herein, refers to a quality of video forming the multiple versions of videos adapted to appeal to certain users to match the quality of an otherwise original video provided to an entire network.

In addition, the use of a computing cloud and its various computing resources, there is provided a capability to partially render already existing videos so as to create multiple versions of videos such that each can appeal to certain segments of users accessing the network. Accordingly, in so doing, partial rendering, as provided herein, may alter certain dynamical portions of an originally obtained video while keeping certain static elements of the original videos in place. This enables altering the video for targeting certain users, while ensuring to preserve certain uniformity in all of the created versions of videos distributed to the various users throughout the network. Such partial rendering, as implemented via the below disclosure, is further adapted to provide an overall broadcast quality matching that of originally obtained and distributed videos.

In so doing, the present technique makes use of certain software and/or hardware elements for defining dynamical templates of an advertisement to accommodate personalized user preferences, such as certain local lifestyles, local weather conditions, gender, demographic make up, and times of day, week, year, holidays, local prices and personalized visual, audible and/or textual features. Once the particular definitions are implemented for each template, the present technique renders multiple versions of the movie or commercial advertisement in accordance with the above preference. Thereafter, the disclosed systems provide an output, including the multiple movie versions distributed to various locales across the network. Ultimately, each of the different network locales is adapted to receive a personalized advertisement having content similar to the content of the original ad. However, such personalized videos may each include various scenery, images, sounds, objects, texts and so forth, tailored to be personalized and specific to various users, for example, such as those located specific regions or those having a personal preference, relation, or liking, respectively, to certain features the ad may include. Thus, in accordance with the present technique, advertisers are better adapted to reach and target a consumer audiences for promoting information associated with their products and/or services.

Other aspects of the invention may include a system arranged to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
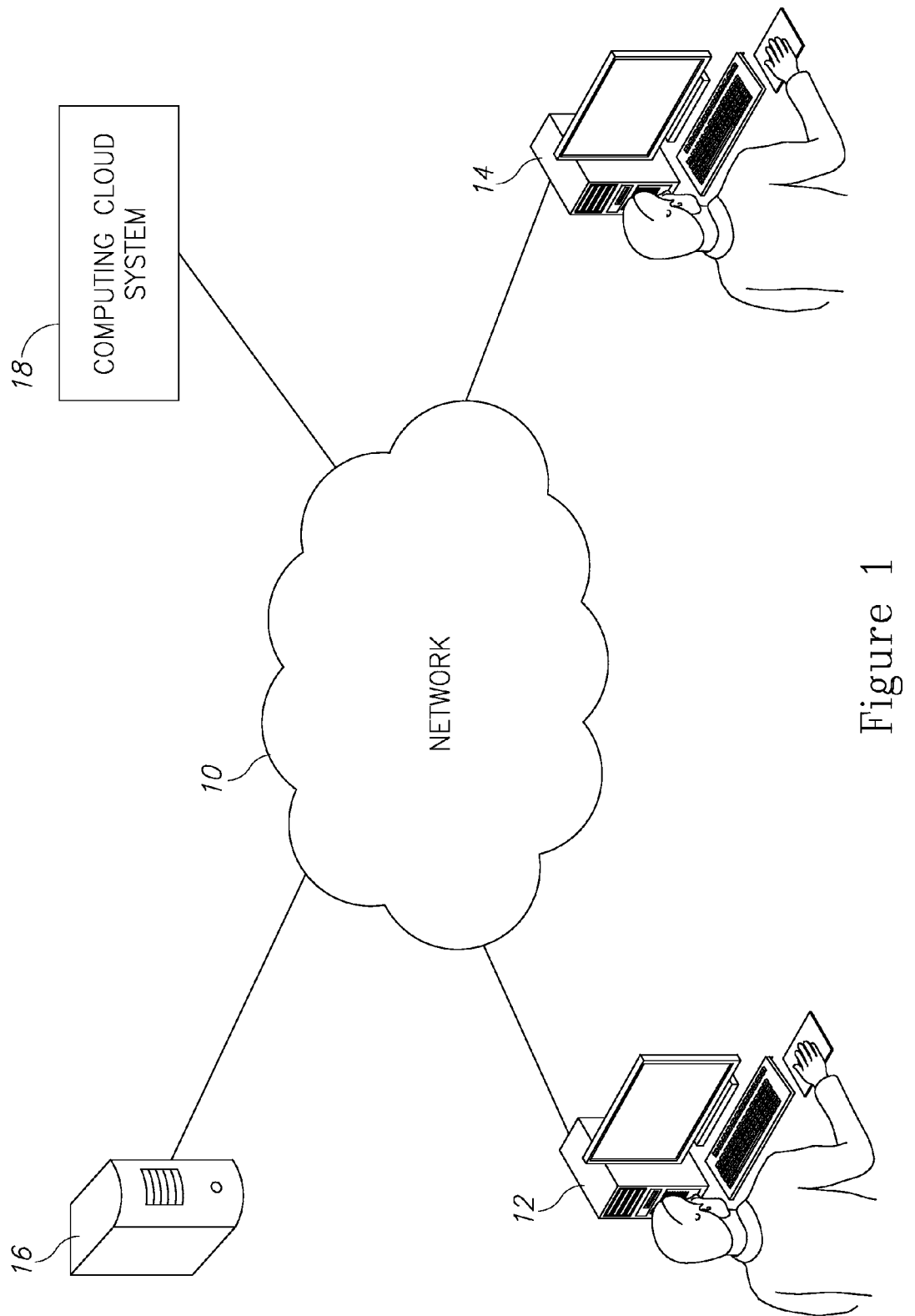
FIG. 1 illustrates a network, in accordance with an embodiment of the present technique.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Turning now to the Figures, FIG. 1 illustrates a network 10, in accordance with an exemplary embodiment of the present technique. The network 10 is an exemplary embodiment of a platform on which personalized dynamic videos are created, processed, rendered, stored and/or provided to multiple users having access to the network 10. Accordingly, network 10 is a communications network adapted for connecting various nodes, such as servers, computer systems and end users, as well as for facilitating the transfer of data between the nodes and end users. Further more the network 10 may be formed of various dedicated computer system and/or servers, some of which may be functioning as a computer cluster and/or computing cloud for providing and distributing personalized videos in accordance with exemplary embodiments of the present technique.

More specifically, FIG. 1 illustrates, nodes/endpoints/end users 12 and 14, as well as, servers 16, and computing cloud system (CCS) 18. The user 12 and/or 14 may be client computers such as a home or office personal computer (PC), a remote client, a thin client, a mobile device, and/or other type of computer and/or processing interface adapted for general data processing and for connecting to the network 10. Although not illustrated by FIG. 1, the client computers may further be coupled and/or connected to other peripheral devices, such as monitors, keyboards, mice, printers, routers, wireless devices, microphones, speakers, cameras, finger print identifiers, external memory devices, and other devices. The PC 12 may include software platforms and operating systems, such Windows, Linux-Red Hat, and other supporting programs. As will be discussed below, the CCS 18 may be part of a computing cloud, such as one available by Amazon- .com or other vendors, having multiple servers, processors and the like, adapted to intake original ad digital video data and perform considerable processing on such data for ultimately rendering creating multiple versions of the original ads. Accordingly, the object of such processing is to conform to the personalized desires and preferences of users having access to such video ads. In certain exemplary embodiments, the cloud 18 may utilize various algorithms and techniques, such as those coordinated and performed in parallel and/or in conjunction with other supercomputing operations for rendering and generating multiple versions of videos out of the originally obtained advertisement.

Thus, users having access to the network 10 may be provided with personalized videos as part of any general browsing or searching of the network 10. It should be borne in mind that the network 10 may be accessed by a plurality of users, such as the users 12 and 14, formed of various segments, locations, preferences, and/or other attributes characterizing the personal make up of the network users. For example, users accessing the network 10 may be dispersed over various geographical regions/segments of the network, or the users may make different demographical, gender and/or other segments. By further example, the users, i.e., users 12 and 14 may have different shopping habits, movie and/or music preferences, and/or other parameters varying in accordance with those users' personal attributes and characteristics. Accordingly, as part of general browsing operations through the network for performing any of the above-mentioned network related tasks, the various user segments the network may download any otherwise generic advertisement made up a video personalized in accordance with the aforementioned user attributes. In other words, while, for example, both the users 12 and 14 may access a webpage having an advertisement showing a video of a particular vendor, each of the user will receive a version of the video custom tailored to that user personal, demographic and/or geographical preference and/or location, respectively.

Returning to FIG. 1, the server 16 and CCS 18 may be adapted for storing, routing and/or communicating data within the network 10 and/or other networks to which the server 16 and CCS 18 may be connected. Thus, the server 16 may store information related to material included as part of vendor website, such as those belonging to certain vendors advertisers, promoters, administrators and so forth. Alternatively, the server 16 may store originally created ads, as well as parameters specifying the manner by which personalized should be rendered. In addition, the CCS 18 may be formed of multiple processors, servers, and/or other dedicated devices, such as those used for forming, processing, and/or encoding personalized videos, as implemented by the system 10 illustrated and discussed above.

Further, in an exemplary embodiment, the server 16 may be of the type available by Sun Microsystems, Hewlett Packard, Dell, International Business Machines (IBM), and/or other known server vendors and providers. Accordingly, the server 16 and the CCS 18 may include various hardware devices, such as microprocessors, memory cards, graphic cards, routers, wireless devices and other modules for receiving, transmitting and/or processing data. In addition, the servers may include various software platforms and packages, such as those providing code written in Java, Python, Ruby on Rails, and/or other computer languages, for facilitating the everyday operation and use of the server 14 and CCS 18 as part of the network 10. It should further be borne in mind that the user nodes 12 and 14 and the servers 16 and CCS 18 are exemplary, and that the network 10 may include many other additional user nodes similar to the users 12 and 14, as well as, multiple other servers similar to those discussed herein.

Further, the server 16 may be adapted to store data, such as websites, generally accessible to the user 12 and/or 14 via the network 10. Those skilled in the art will appreciate that each website accessible, for example, to the user may contain multiple web pages, also be accessible to those users upon request. For example, the server 14 may store websites of private companies and/or corporations, as well as government and/or other pubic organizations. Hence, the server 14 provides access to the user 12 of web pages provided by the above mentioned private or public entities so that the user, for example, can conduct business and/or manage various tasks through the network 10. For instance, the user 12 may access the server 14 for downloading a webpage belonging to a vendor through which the user 12 may perform financial transactions such as when purchasing consumer items or the like. By further example, the user 12 may access the server 14 for downloading webpages, such as those associated with various public institutions, through which the users 12 and 14 can provide personal and/or other type of information for conducting everyday personal and/or work-related business and so forth. Accordingly, the users 12 and 14 may generally form communication sessions during which the user 12 and server 14 exchange information through the network 10.

Hence, as part of accessing the above network for conducting aforementioned tasks, the network 10 is adapted to provide users 12 and 14 with advertisement videos, each personalized to the users liking, and/or other preferences, as described further below. Hence, for example, while the user 12 may access a vendor's site and be provided with a certain video, the user 14 may access the same site and be provided with the same overall video. However, to the extent personalized and/or other parameters of the users 12 and 14 may vary, so will those videos accessed, respectively, by the users in accordance with the aforementioned references. Thus, each video accessed by the users 12 and/or 14 may be partially rendered to change certain features for presenting the video as better appealing the particular user watching the video.

Figure 2:
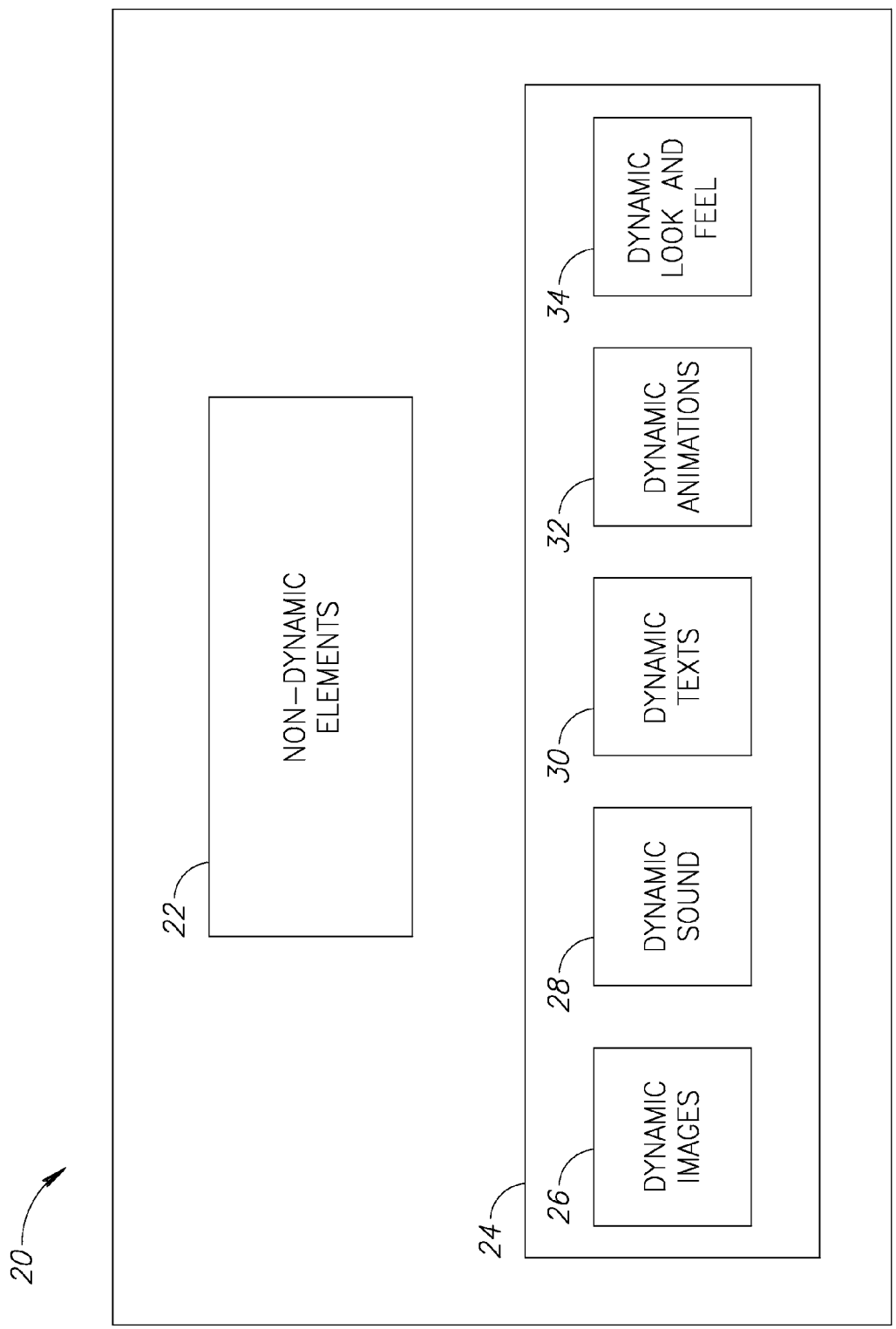
FIG. 2 is a block diagram of a digital item, in accordance with an exemplary embodiment of the present technique.

FIG. 2 is a block diagram a digital item 20, in accordance with an exemplary embodiment of the present technique. The digital item/template 20 may generally be part of a structured digital object, a form, or a combination of resources such as videos, audio tracks, images; or metadata, which may further include items such as descriptors and identifiers; and structures for describing the relationships between the resources the digital item/object, may include.

More specifically and in accordance with an embodiment of the present technique, the digital item 20 forms a digital movie and/or images part of an advertisement, commercial and/or other promotional material accessible to the users 12 and 14 through the network 10. Accordingly, those skilled in the art will appreciate that the depiction shown in FIG. 2 is more of a representation of digital components from which such digital items are formed and therefore, the depiction of such elements are exemplary for illustration purposes included herein to provide a general understating of the present technique.

Thus, the digital item 20 may form a digital movie part of an advertisement or commercial adapted to be displayed, viewed and/or heard on a computer, such as a home, office or any other type computing device, i.e., mobile device or a handheld device etc. Hence, movie advertisements formed by the digital item 20 may be provided over the Internet so that those may be downloadable by the users at various locales, regions and countries at their time of choosing or at designated times, as may be determined by a vendor, advertiser and/or other enterprises wishing to promote and/or disseminate information to the general public. Accordingly, such movie commercials may be made up of data forming substantive information and various contents that can be typically played on an Internet digital player, spanning a time duration that could last seconds, minutes or longer, depending on choice of the various providers making use digital items, such as the item 20.

As further illustrated by FIG. 2, the digital item 20 is made up of non-dynamical elements 22, as well as dynamical elements 24, including dynamic images 26, dynamic sounds 28 and dynamic texts 30. The dynamic elements 24 are further made up of dynamic animations elements 32 and dynamic look and feel elements 34. The non-dynamical elements/data 22 of the digital item 20 form elements that may usually be static and are otherwise not personalized to the specific user to which the commercial formed by the item 20 is intended. In other words, the non-dynamical elements/data 22 form those features of an advertisement that would be provided to all users viewing the advertisement, regardless of the region, demographic, other personalized preference to which the various users belong. Thus, non-dynamical elements 22 may be associated with certain objects, features, or other attributes (see below FIGS. 3 and 4) shown in each and every version of an advertisement originating from the item 20, as provided to the user. For example, in one embodiment, the elements 22 may form an image or movie of person whose depiction overtime would be identical regardless of where and how the commercial is shown. By further example, the elements 22 may form, for example, portions of landscape, trees, grass, buildings and/or other moving or static elements that would be displayed identically in all personalized video commercials.

By contrast, dynamical elements 24 are those elements within the commercial or ad intended to be varied and/or modified in accordance with preferences tailored for specific users, for example, located in various regions. Thus, dynamic images element 26 may form certain images or portions thereof of a commercial clip that could be specifically custom made to the user viewing the commercial. For example, the element 26 may form background sceneries, conditions or views, such as oceans, trees, roads, bridges and other scenery typifying the general location where certain users may reside, work, or those locations to which certain users may have some relation or affiliation. By further example, element 16 may emulate weather conditions i.e., sunshine, rain, snow, fall, winter and so forth, normally typifying conditions at a locale of a respective consumer who is viewing the advertisement. Hence, the dynamic image elements 26 may emulate various lighting, brightness, shading, and other visual effects and conditions and features to fit various settings in various regions.

Still by further example, dynamical elements 26-34 may include features specific to a particular gender, that is, the elements 24 may incorporate in an otherwise generic videos features adapted to appeal to a specific gender in which certain attributes of the video could accentuate certain features to which the targeted gender can relate. For example, a video displaying an automobile commercial can be personalized to appeal to women by using the dynamic images 26, and or animation element 32 to form an automobile having color usually likeable to women, such as pink, red, etc. Hence, while the aforementioned automobile commercial may originally be created and widely distributed as a generic advertisement having a generic automobile color, i.e., a color not necessarily adapted to target an audience segment, the present technique uses partial rendering techniques to create multiple versions of the advertisement, whereby each version is adapted to accentuate a particular feature bound to appeal to certain users who may find such features interesting or at least worth noting.

Similarly, dynamic sounds element 28 forms an audible portion of the digital item 10 which can be changed and/or tailored in accordance to consumer location and/or other preferences. Thus, the elements 28 can form part of an audible portion adapted for specifying specific locations, such as streets, buildings, parks and/or other landmarks that could be of interest and are specific to the user's locations and other preferences, such various languages, gender voice, accents, dialects. Thus, for example, dynamical sounds element 28 can be used to alter a certain dialect or an accent of a speaker of generic-made commercial to include a dialect appealing to certain population groups. For example, a commercial, originally having an actor/speaker utilizing a particular accent (i.e., Anglo-American) can be personalized to show that same speaker talk in a different accent, i.e., such that shared by Spanish-American, so as to provide such a group similar informational content, yet more personalized and appealing to that group.

In addition, dynamic texts element 30 provides a portion of digital item 20 having textual portions which, too, can be changed to fit the location and other attributes with which the viewer is associated. Hence, the dynamic texts element can form any readable or otherwise viewable contexts such as titles and subtitles, product names, service names, street names, maps, satellite photography and the like. Thus, the digital item 20 can be part of a commercial ad advertized, for example, by a chain store or a franchise having multiple stores dispersed in different locations across a country or region, whereby the dynamic text elements 30 are adapted to display, for instance, a general map showing the store location in relation to where the ad or movie commercial is shown. For example, a viewer in Los Angeles (LA), Calif. will view the commercial in which the element 30 is adapted to display a map of the store closest to the viewer located in the LA area. Similarly, a viewer in Miami, Fla. will be able to see the same commercial while being provided with substantive content similar to that of the ad shown in the LA area, however, the commercial provided to the viewer in the Miami area will include a map showing the user where the closest store in that user's area is located.

In so doing, the present technique contemplates using the digital item/template 20, particularly, the dynamic elements 24 to generate multiple versions of commercial videos, each having similar informational content, yet, each generated to custom fit user(s) preferences, including but no limited to user locations, demographic make up, gender, etc.

Figure 3:
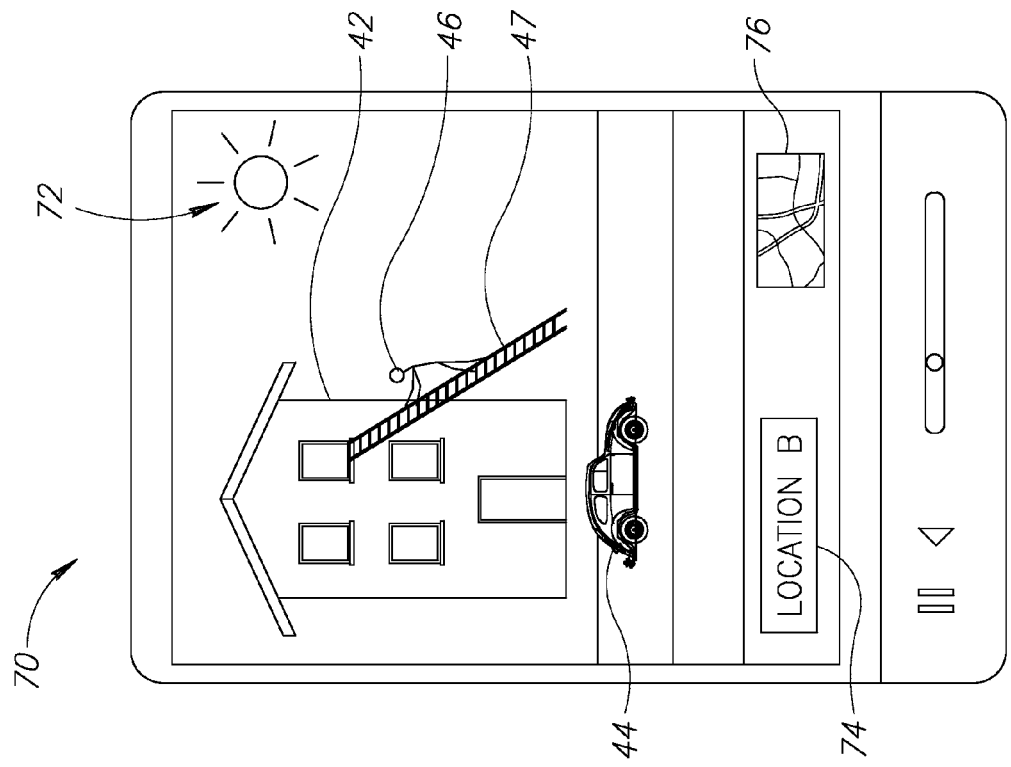
FIG. 3 is a depiction of a video scene, in accordance with and exemplary embodiment of the present technique.
Figure 4:
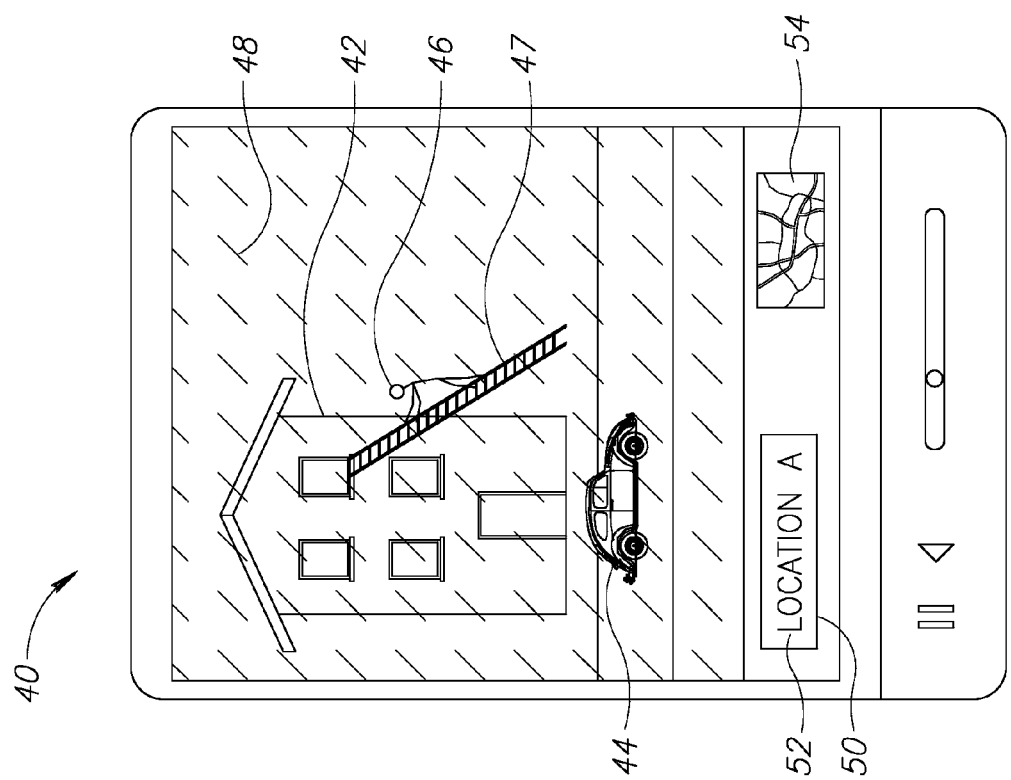
FIG. 4 is a depiction of another video scene, in accordance with an exemplary embodiment of the present technique.

FIGS. 3 and 4 are depictions of video scenes, in accordance with and exemplary embodiment of the present technique. Hence, for example, FIG. 2 depicts a commercial scene 40, such as one provided by a vendor or chain store, for advertizing and promoting various products and/or services. As illustrated, the scene 40 includes various items and objects, such as a house 42, car 44, person 46 and ladder 47. Accordingly, the commercial seen 40 may be adapted to promote products, such roofing of the house 42, ladders (e.g., ladder 47), and/or services (e.g., roofing, landscape and other services). Further, the scene 40 also includes a background 48, for example, indicative of certain weather winter-like condition, i.e. rain, storms and so forth. As further shown, at the bottom of scene 40, the illustrated embodiment further includes a portion 50, including a text box 52 and a map portion 54. Accordingly, text box 52 and map portion 54 are adapted to provide a viewer with location and other details regarding specific stores located within the vicinity of the user. Hence, the scene 40 can be generated and custom fitted to include certain information, such as hours of operation, special products, special sales and discounts and other types of promotional material, all specific to the region in which the commercial movie is displayed, as well as specific to other personalized preferences that would enable vendors to appeal to certain segments of users having access to a network on which personalized videos are accessible.

In addition, in the illustrated embodiment of scene 40, the background 48 can be chosen to include weather-like conditions indicative of the conditions observed and experienced in accordance with the where the specific store is advertized. Thus, the winter-like conditions 48 of scene 40 can be tailored to fit places such as those located, for example, in the northeastern portions of the United States, where similar conditions may apply and where a consumer may be experiencing similar whether conditions. Hence, in providing consumers with video contents tailored to consumers' settings, vendors and/or advertisers can target and better appeal to consumer's preferences and/or locale conditions that are specific to where such consumers are located.

By further example, FIG. 4 shows a scene 70 that is almost identical to the scene 40 of FIG. 3 with exceptions of background 72, text box 74, and map portion 76, all providing similar content and information, yet, specific to a location different from that shown in FIG. 3. Accordingly, in the illustrated embodiment of FIG. 4, background 72 illustrates a clear, sunny-like day indicative of weather conditions that could otherwise present, for example, in the southwestern portions of the United States. Thus, while the scene 70 may be part of a commercial identical to the one provided by the scene 40, the scene 70 may include content and other information adapted for appealing to consumers located in the aforementioned part of the U.S., and where corresponding vendor stores and locations are located. Thus, text box 74 and map portion 76 correspondingly provide the consumer located in that part of the country information pertaining to location, store hours, products, special sales and other related material specific to where the consumer is located.

Still by further example, a chain store promoting certain home and related products can use specially tailored made commercials, such as the scene 40, for advertizing certain winter tools, such as snow plows, shovels and other winter items to those populations located in regions where the scene 40 experiencing a winter like-setting. Thus, to the extent the user of scene 70 is provided with substantive information similar to that provided in scene 40, the viewers of the sunny scene 70 will not provided with the winter-like background and related queues but, instead, the provided with corresponding products adapted for summer and sunny weather, in other words, shading fixtures, barbeques, pools, fountains, and the like.

By further example, while car 44 of FIG. 3 may be chosen to be that of a particular make, year, and color i.e., Volkswagen Beatle, 2005 flash-green, a favorite among females, the car of FIG. 4, may be illustrated in the commercial as a Corvette, or a Jeep, or another type of an automobile favorite among men. Thus, while the sense 40 and 70 may be adapted to promote a product (not necessarily related to the shown cars), nevertheless, each of the aforementioned scenes can appeal in a varied manner, respectively, to men and women. In other aspects, the two houses 42 of the scenes 40 and 70 can be shown such that their overall design and shape varies in accordance with different population groups. For example, the house of FIG. 3 can be personalized to have Victorian-type architecture, such as that appealable to certain conservative or old fashion population segments. By contrast, the house shown in the scene 70 may be personalized to have modem type architecture, thereby appealing to younger population groups.

Figure 5:
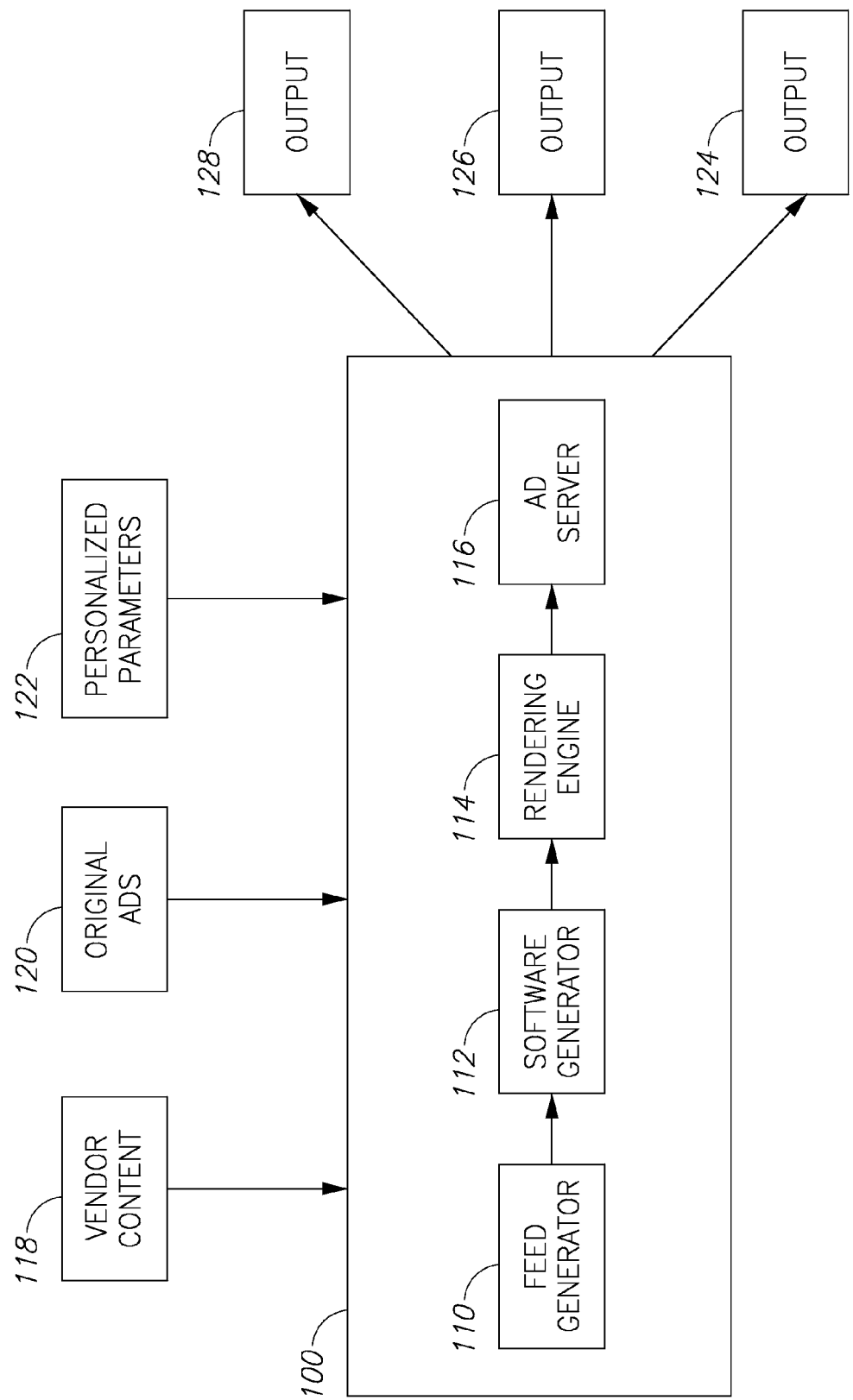
FIG. 5 is a block diagram of a system for providing personalized videos over a network, in accordance with an embodiment of the present technique.

FIG. 5 is a block diagram of a system 100 for providing personalized video over a network, in accordance with an embodiment of the present technique. Generally, the system 100 may be considered as a central computing system such as one forming a portion of a communications network, or computing cluster, a cloud computing structure, or a combination thereof. Accordingly the system 100 is adapted to connect various nodes, such as servers, computer systems and end users, as well as for facilitating the transfer of data between nodes/end users (e.g., users 12 or 14 of FIG. 1). Further, the system 100 may be part of and/or reside in a general network (e.g., network 10 of FIG. 1), including an Internet Network, an Intranet, or other types of local, wide and/or global area communications network, such as those formed of a wire line network, wireless network, satellite network, or a combination thereof.

As further illustrated, the system 100 includes a feed generator device 110, a software plug-in device 112, a rendering engine device 114, and ad server device 116. Those skilled in the will appreciate that the term device, as used herein, may encompass one, multiple, and/or an ensemble of devices, formed either as stand alone or a combination of hardware and/or software platforms, each adapted to store and/or execute various algorithms, routines, and various computational tasks for manipulating and configuring digital elements/templates (e.g., FIG. 2) to ultimately generate, through partial rendering, personalized digital videos over the Internet or other networks, as described above by FIGS. 3 and 4.

Accordingly, those skilled in the art will appreciate that the system 100 and the devices 110-116 may include, either alone or in combination, various microprocessors, servers, such as those available, for example, by Sun Microsystems, Hewlett Packard, Dell, International Business Machines (IBM), and/or other known processor and server vendors and providers. In addition, the devices 110-116 may include, either alone or in combination, hardware devices, memory and storage devices, graphic cards, routers, wireless devices and other modules for receiving, transmitting and/or processing data.

In addition, the system 100, particularly, the devices 110-116 may be housed and/or run on a computing cloud (see FIG. 6), such as that available by Amazon.com and/or similar cloud-providing vendors. As such, the system 100 and its various components may be adapted to run various software platforms and packages, such as those providing code written in Java, Python, Ruby on Rails, and/or other computer languages, for facilitating the everyday operation and use of the system 100.

In accordance with one embodiment of the present technique, the feed generator 110 may form, for example, an RSS feed generator, adapted to intake information, such as a website URL, and or other related material included as part of a specific website 118 belonging to particular vendor(s). Such vendors having the website 118 may include firm(s), commercial companies, or any private or public organization interested in providing the general public with information and content regarding its various products, services, as well as any other general and/or specific information adapted to promote or otherwise enhance the company's image in the public eye. As will be discussed below, such information may include digital content in a form of a digital movie, such as one that can be downloaded and played by an average home or office user upon throughout a communication session, as may happen when a user generally browses the Internet.

Further, once the system 100 obtains a desired website and URL information via the generator 110, (that is, from where the URL information is stored) the software plugging device 112 obtains original ads 120 to further process such ads and provide personalized digital video ads adapted to appeal to specific segments, groups, locations, genders and so forth. As mentioned, such movies may include advertizing and other promotional material, as promulgated by the vendor of the website 118. Further, the device 112, particularly, software plug-ins employed therein may be adapted to generally analyze digital items form which the digital movie is formed. In so doing, the device 112 finds and determines the position of dynamic elements, elements 16-20 (see FIG. 2) so as that those can be modified and/or edited in accordance. Hence, an animator employing the plug-in device 112 can define and mange dynamic texts, visual animations, images, and voice to fit a specific ad that can be personalized and adapted for specific users segment located therein.

More specifically, the device 112 utilizes the non-dynamical elements in conjunction with dynamical elements of the ad, i.e., movie, whereby dummy texts may be inserted to the ad, via an editing software, ultimately determined by constraints are configured in accordance with a desired implementation. For example, certain portions of the movie including text messages may be designated for dynamic rendering, eventually determined according to the animator's choice and/or according to specified demands. By further example, the device 112 can be used to insert and configure certain desired images, as well as vary the properties of images existing in an otherwise distributed movie. This may also include designating and configuring dynamic image background features, such opacity, brightness, lighting, object views, text images and other related visual features.

These and other operations, as performed by the device 112, create what may be called a master ad that can be provided to core rendering engine device 114, adapted to compose all variations of the video ads in accordance with the specified regional and/or other types of preferences to where the ad is intended. In so doing, the rendering engine 114 receives personalized parameters 122 which determine the uniqueness of each ad, as well as the extent to which dynamic elements within each video are varied. Accordingly, the engine 114 inserts into the master ad provided by the software plug-ins 112 actual specific data values to create actual videos, where each video is uniquely created to reflect the various changes in an otherwise original ad, modified to create multiple ads, each adapted to target a certain region, population and so forth.

Once the rendering engine 114 creates the multiple ad movies, the engine 114 encodes each of the multiple movies according to certain accepted and usable image formats, such as .JPEG, .GIF, .MPEG, and other image and/or video well known and used in the industry. Such encoded files are, thereafter, provided to targeting server 116 adapted to receive request for the videos from multiple locations or with users segmentation parameters. Accordingly, upon such requests, the server 116 outputs personalized video ads to multiple end users 124, 126 and 128, including home, office, or other users having access to websites, such as the website 118. In this manner, each of the different users 124, 126 and 128 may individually receive a personalized video that accommodates and is made to fit the user's regional or geographical location and setting. Thus, while outputs 124-128 may generally be formed of the same ad (see FIGS. 3 and 4), each sharing similar content information and appearance, those outputs may differ to some extent according to the personalized preferences 122, defined above. For example, users viewing output 124 in one region may view a video that may be visually identical the output 126 viewed in another region, however, the video 124 may contain textual information (e.g., maps, location address, store names, etc.) indicative of the first region while the output 126 may contain textual information indicative of the second region, yet, different from the first region. As mentioned herein, the varied outs 124-126 may contain personalized attributes appealable to various user groups, such as gender, groups, demographic groups, cultural groups, age groups, employment groups, social groups, artistic and academic groups, fraternities, hobby and sport clubs, and/or other associations with which general users having access to the network can relate. Thus, personalized videos discusses herein can provide an otherwise generic advertisement while tweaking certain images, colors, sceneries, and/or voices, i.e., dialects, languages and the like to appeal to certain group segments who may find those particular colors and/or accent appealing. In so doing, the present technique creates a multitude of versions of the same ad, each having its own personalized features for targeting a certain population group, while preserving the overall content conveyed by the originally and previously created and distributed ad.

Figure 6:
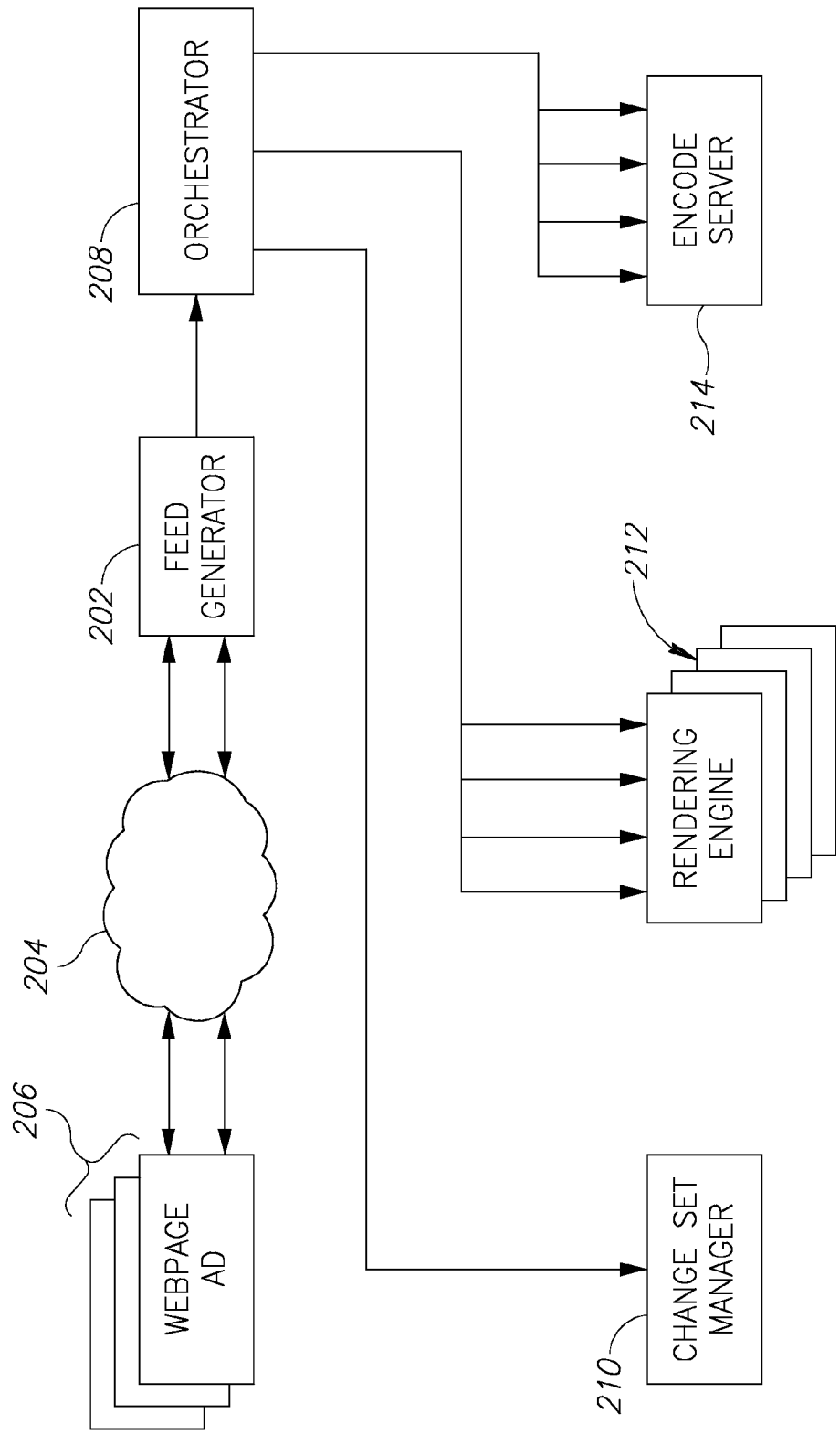
FIG. 6 illustrates a system for rendering personalized video, in accordance with an embodiment of the present technique.

FIG. 6 illustrates a system 200 for rendering personalized video, in accordance with an embodiment of the present technique. The system 200 includes various components adapted to receive original webpage data having original ads, as well as components for processing such data for ultimately rendering and encoding personalized videos, such as those described above. Furthermore, because the rendering process of the personalized video can be quite computationally demanding, the system 200 may be implemented over a computing cloud or a computing cluster having servers and/or processors, dedicated for processing voluminous data, and adapted for executing and performing various computational tasks in parallel that could otherwise be too overwhelming for conventional computing systems. To the extent resources of the computing cloud are needed for rendering or partial rendering personalized videos, the amount of devices dedicated to such tasks within the cluster could expand or contract as the needs for using such resources changes with time. Thus, the disclosed computing cloud/cluster may be continually elastic and dynamic for efficiently accommodating the computational tasks at hand.

It should further be borne in mind that the term computing cloud and/or computing cluster as used herein refers to a consolidated remote data and processing system adapted for allocating and provisioning dynamical and scalable virtualized resources. Accordingly, computing resources located on the cloud as for example, provided by Amazon.com, may take a form of ease to access remote computing sites provided by a network, such as an Internet, and/or other forms of web-based tools or applications that users can easily attain and use through web browser. In such implementation, the cloud offers a real time emulation of programs and applications as if those were installed locally on the client's computer.

Returning to FIG. 6, the system 200 includes a feed generator 202 adapted to retrieve original ads through network 204 from webpages 206. From the acquired webpges 206, the feed generator 202 is further adapted to generate structured data, such as an XML file, including dynamical ad data that is prone to change as part of creating those portions of the video ad that ultimately become personalized and may appeal to certain segment of the network. Such data is then provided to the orchestrator 208 which, among other things, functions to oversee the entire rendering operations of the personalized videos generated by the system 208. Hence, the orchestrator 208 obtains from the original ad, those digital elements of the ad defined as static, as well as those elements defined as dynamic, as further brought forth above by FIG. 2.

Upon receiving such information, the orchestrator 208 prompts change set manger (CSM) 210 to recognize and identify ongoing computational changes currently occurring or those about to occur in the cloud 200. Thus, if new ads originating from the webpages 206 are provided to the cluster 200, as may happen at any given moment, the CSM 210 provides a real time overview and assessment of resources available to the cluster 200 for performing the current required operations, as well as those resources that would be needed to performing processing and creating new personalized videos based on the newly acquired ads 206.

For example, the CSM 210 may identify certain ads, previously acquired from webpages 206, as no longer running, outdated, or otherwise unavailable for further processing to create personalized video for distribution across the network. Alternatively, the CSM 210 may recognize the emergence of new ad videos, as may be provided by one or more vendors, requiring processing and rendering for creating multiple versions of personalized videos. Thus, cessation or emergence of new videos available for processing in accordance with the present technique may be part of commercial and/or promotional campaigns conducted by one ore more vendors attempting to commercialize and bring forth products and/or services to various segments of network users.

Hence, orchestrator 208 obtains the real times assessment of resources available to the cloud 200, as provided by the CSM 210, to coordinate further rendering operations, as performed by rendering engine servers 212, for generating multiple versions of personalized videos. Thus, the orchestrator 208 is adapted to time and/or synchronize the operation of servers 212 in accordance with the needs specified to the cloud for processing newly acquired ad videos from the webpages 206. Hence, rendering servers 212 may operate in parallel and in a capacity that could change at any given point of time depending on varying loads experienced by the cloud 200. Hence, the ability of the computing cloud 200 to tap or release rendering servers 212 and/or other resources at will, provides much flexibility for better facilitating a better, efficient and cost effective system for generating multiple versions of personalized videos. Furthermore, the ability of the cloud, particularly the orchestrator 208 to distribute and allocate the rendering operation of large scale data may significantly reduce the amount of rendering time allocated for generating each personalized video. Thus, by utilizing the cloud 200, personalized ad movies, normally taking hours to render, may be rendered in minutes, thereby leading to substantial reduction of processing time and cost.

Figure 7:
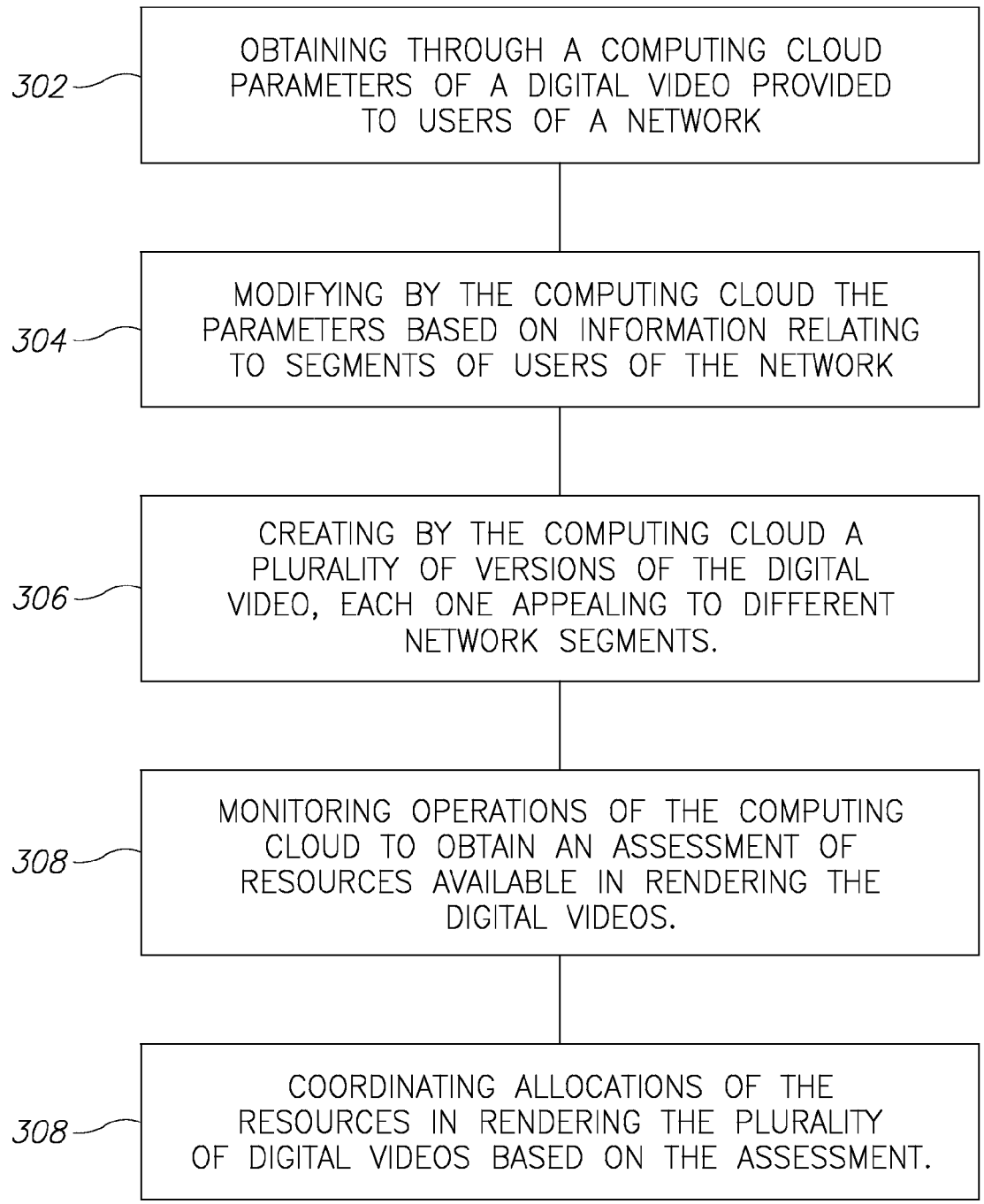
FIG. 7 is a block diagram describing a process, in accordance with an embodiment of the present technique.

In further aspects of the present technique, the computer cloud 200 further includes servers, such as servers 214, adapted for encoding the personalized videos, as rendered by the servers 212. In so doing, orchestrator 208 prompts servers 214 to encode the videos rendered by the serves 212. Accordingly, those skilled in the art will appreciate that the personalized videos may be encoded in accordance with a variety of known digital video formats, such as MPEG., JPEG. MMV., and/or other known formats. In so doing, orchestrator 208 may coordinate various operations of available encoding servers 214, so as to expand or contract the computing capacity of the cloud 200 with varying needs. Such needs may be specified by the amount of originally acquired videos ads from webpage 206, as well as by the urgency required to produce and/or make such videos available for distribution across the networks FIG. 7 is a block diagram 300 describing a process, in accordance with an embodiment of the present technique. Accordingly, the process 300 describes a method for partial rendering personalized videos utilizing computer resources available within a computing cloud. The process 300 may employ various hardware and/or software platforms for executing certain routines, algorithms and/or programs adapted obtain, modify and ultimately encode the personalized digital ads, as described above with regard to the foregoing figures. Hence, those skilled will appreciate the such computerized implementations and software may be designed, encoded and/or compiled using a variety of tools including using an assortment of computer codes and languages, including C, C++, Python, Pearl, Ruby on Rails, and/or other languages, as would be appreciated by one having ordinary skill.

The process begins 300 at block 302 whereby one or more feed generators of a computing cloud obtains through one and/or more feed generators of a computing cloud, parameters of a digital video. Such video may generally be provided to users having access to the network and its various applications. Further, the process 300 further includes step 304 whereby the obtained parameters are modified by one and/or more software generators located within the computing cloud. The modification, as obtained at step 304 is based on information relating to segments of the users of the network. Hence, this information may relate to various aspects of segments of network, including information on their personal preferences, geographical location, demographic and/or gender make up, and many other aspects.

The process 300 further includes step 306, in which a plurality of versions of the originally obtained video are created based in the modification of the parameters. Step 306 may generally be performed utilizing one or more rendering engines located within the computing cloud. In so doing, the present technique utilizes the cloud to perform a significant amount of rendering operations of numerous digital video frames belonging to various digital video ads. Hence, the use of the computing cloud provides a robust platform for performing heavy and laborious computing operations, thereby significantly shortening entire rendering operations. In accordance with other aspects of the present technique, the process 300 further includes step 308 whereby the rendering and other operations performed by the cloud are monitored through one or more processing devices. In so doing, the step 308 achieves a real time assessment of rendering resources available to the computing cloud in rendering the plurality of digital videos. Finally, the process 300 includes step 310, allocation of computer resources in rendering the various versions of videos is coordinated based on the real time assessment obtained at step 308.

What is claimed is:

1. A method, comprising:
   obtaining, by one or more feed generators of a computing cloud, parameters of a digital video, wherein the video is adapted to be provided to users over a network;
   modifying, by one or more software generators of the computing cloud, one or more of the obtained parameters, wherein modifications are based on information relating to segments of the users of the network;
   creating, by one or more rendering engines of the computing cloud, based on the modification, a plurality of versions of the digital video, wherein each one of the plurality of versions comprises a broadcast quality digital video having a different modification adapted to appeal to at least one of the segments of the users of the network;

monitoring through one or more processing devices, operations of the computing cloud to obtain a real time assessment of rendering resources available to the computing cloud in rendering the plurality of broadcast digital videos;

identifying previously acquired digital videos no longer available for the creation of digital video versions and newly provided digital videos for which digital video versions need to be created; and coordinating allocations of the rendering resources, including tapping or releasing rendering engines, in rendering the plurality of digital videos by the one or more rendering engines, based on the real time assessment and the identified previously acquired and newly provided digital videos.

2. The method according to claim 1, wherein modifying comprises partial rendering the video to obtain the plurality of versions of the broadcast quality digital videos.

3. The method according to claim 1, comprising encoding by one or more encoders of the computing cloud each one of the plurality of versions of the digital videos.

4. The method according to claim 1, comprising creating by one and/or more software generators of the computing cloud a video template incorporating the obtained parameters, and modifying by the one and/or more rendering engines of the computing cloud the template to create the plurality of versions of the digital video.

5. The method according to claim 1, wherein digital video comprises a commercial video appearing over the World Wide Web on all screens.

6. The method according to claim 1, wherein the parameters comprise, text data, visual data, image data, audible data, voice data, animation data, look and feel data or any combination thereof.

7. The method according to claim 1, wherein the information comprises at least one of location data, language data, weather data, marketing data, financial data, demographics data, social information data, consumer data, local data, and/or any combination thereof.

8. The method according to claim 1, comprising encoding each one of the plurality of versions of the digital videos.

9. The method according to claim 1, wherein segments of the users comprise gender groups, demographic groups, age groups, employment groups, cultural groups, academic groups, sport groups, hobby groups, social groups and/or any combination thereof.

10. A system for generating digital videos, comprising: a computing cloud comprising:

a memory;

a processor;

a feed generator adapted to obtain parameters of a digital video, wherein the video is adapted to be provided to users of a network;

at least one rendering processor coupled to the feed generator, wherein the at least one rendering processor is adapted to modify one or more of the obtained parameters, wherein modifications are based on information relating to segments of the users of the network, and wherein the at least one processor is adapted to render, based on the modifications, a plurality of versions of the digital video, wherein each one of the plurality of versions comprises a broadcast quality digital video having a different modification adapted to appeal to at least one of the segments of the users of the network;

at least one monitoring server adapted to monitor operations of the computing cloud to obtain a real time assessment of rendering resources available to the computing cloud in rendering the plurality of digital videos;

at least one change set manager adapted to identify previously acquired digital videos no longer available for the creation of digital video versions and newly provided digital videos for which digital video versions need to be created; and at least one coordinating processor coupled to the at least one monitoring processor adapted for coordinating allocations of the rendering resources, including tapping or releasing rendering processors, in rendering the plurality of digital videos by the one or more rendering processor based on the real time assessment and the identified previously acquired and newly provided digital videos.

11. The system according to claim 10, wherein modifying comprises partial rendering the video to obtain the plurality of versions of the broadcast quality digital videos.

12. The system according to claim 10, comprising at least one encoding processor included within the computing cloud, wherein the at least one encoding processor is coupled to the at least one coordinating processor, and wherein the at least one encoding processor is adapted encoding by one or more encoders of the computing cloud each one of the plurality of versions of the broadcast quality digital videos.

13. The system according to claim 10, wherein the at least one rendering processor is adapted to create a video template incorporating the obtained parameters, and wherein the at least one rendering processors is adapted to modify the template to create the plurality of versions of the digital video.

14. The system according to claim 10, wherein digital video comprises a commercial video appearing over an Internet webpage.

15. The system according to claim 10, wherein the parameters comprise, text data, visual data, image data, audible data, voice data, animation data, touch and feel data or any combination thereof.

16. The system according to claim 10, wherein the information comprises at least one of location data, language data, weather data, marketing data, financial data, demographics data, social information data, consumer data, local data, and/or any combination thereof.

17. The system according to claim 10, wherein segments of the users comprise gender groups, demographic groups, age groups, employment groups, cultural groups, academic groups, sport groups, hobby groups, social groups and/or any combination thereof.

18. A computer program product comprising:

a non-transitory computer readable storage medium having computer readable program embodied therewith and adapted to be executed by a computing cloud, the computer readable program comprising:

computer readable program configured to obtain parameters of a digital video, wherein the video is adapted to be provided to users of a network;

computer readable program configured to modify the obtained parameters, wherein modifications are based on information relating to segments of the users of the network; and computer readable program configured to create a plurality of versions of the digital video, wherein each one of the plurality of versions comprises a broadcast quality digital video having a different modification adapted to appeal to at least one of the segments of the users of the network;

computer readable program configured for monitoring through a processing device operations of the computing cloud to obtain a real time assessment of rendering resources available to the computing cloud in rendering the plurality of broadcast quality digital videos;

computer readable program reconfigured to identify previously acquired digital videos no longer available for the creation of digital video versions and newly provided digital videos for which digital video versions need to be created; and computer readable program configured for coordinating allocations of the rendering resources, including tapping or releasing rendering processors, in rendering the plurality of digital videos based on the real time assessment and the identified previously acquired and newly provided digital videos.

19. The computer program product according to claim 18, wherein modifying comprises partial rendering the video to obtain the plurality of versions of the broadcast quality digital videos.

20. The computer program product according to claim 18, comprising computer readable program configured to create a video template incorporating the obtained parameters, and a computer readable program adapted to modify by the one or more rendering engines the template to create the plurality of versions of the digital video.

21. The computer program product according to claim 18, wherein digital video comprises a commercial video appearing over an Internet webpage.

22. The computer program product according to claim 18, wherein the parameters comprise, text data, visual data, image data, audible data, voice data, animation data, look and feel data, or any combination thereof.

23. The computer program product according to claim 18, wherein the provided information comprises at least one of location data, language data, weather data, marketing data, financial data, demographics data, social information data, consumer data, local data, and/or any combination thereof.

24. The computer program product according to claim 18, a computer readable program configured to encode each one of the plurality of versions of the digital videos.

25. The computer program product according to claim 18, wherein segments of the users comprise gender groups, demographic groups, age groups, employment groups, cultural groups, academic groups, sport groups, hobby groups, social groups and/or any combination thereof.

* * * * *